(12) United States Patent
Hasegawa

(10) Patent No.: US 8,639,054 B2
(45) Date of Patent: Jan. 28, 2014

(54) IMAGE PROCESSING APPARATUS FOR NOISE REMOVAL AND EDGE ENHANCEMENT BASED ON EDGE DIRECTION

(75) Inventor: Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 1124 days.

(21) Appl. No.: 12/176,474

(22) Filed: Jul. 21, 2008

(65) Prior Publication Data

US 2009/0041371 A1 Feb. 12, 2009

(30) Foreign Application Priority Data

Aug. 7, 2007 (JP) ................. 2007-205830

(51) Int. Cl.
*G06K 9/40* (2006.01)
(52) U.S. Cl.
USPC ........... 382/266; 382/181; 382/195; 382/199; 382/254; 382/260; 385/1.9; 385/2.1; 385/3.15; 385/3.27; 348/221.1; 348/252; 348/610; 348/625; 348/627
(58) Field of Classification Search
None
See application file for complete search history.

(56) References Cited

U.S. PATENT DOCUMENTS

| 6,339,479 | B1 * | 1/2002 | Kishimoto | 358/1.2 |
|---|---|---|---|---|
| 6,370,279 | B1 * | 4/2002 | Paik | 382/268 |
| 6,614,484 | B1 * | 9/2003 | Lim et al. | 348/448 |
| 6,714,242 | B1 * | 3/2004 | Kobayashi | 348/272 |
| 6,735,341 | B1 | 5/2004 | Horie et al. | |
| 7,379,625 | B2 * | 5/2008 | Wang et al. | 382/300 |
| 7,590,307 | B2 * | 9/2009 | Wang et al. | 382/300 |
| 7,664,316 | B2 * | 2/2010 | Aoki | 382/162 |
| 8,120,817 | B2 * | 2/2012 | Lee | 358/3.27 |
| 2001/0035969 | A1 * | 11/2001 | Kishimoto | 358/1.9 |
| 2002/0140833 | A1 * | 10/2002 | Hirai | 348/280 |
| 2003/0076447 | A1 * | 4/2003 | Wang et al. | 348/571 |
| 2003/0206667 | A1 * | 11/2003 | Wang et al. | 382/300 |
| 2004/0090443 | A1 * | 5/2004 | Wang | 345/611 |
| 2005/0220350 | A1 * | 10/2005 | Morisue | 382/199 |
| 2006/0170826 | A1 * | 8/2006 | Park et al. | 348/669 |
| 2007/0280539 | A1 * | 12/2007 | Hasegawa et al. | 382/195 |
| 2008/0123998 | A1 | 5/2008 | Gomi et al. | |
| 2008/0170158 | A1 * | 7/2008 | Jung et al. | 348/581 |

FOREIGN PATENT DOCUMENTS

| JP | 2000-13612 | 1/2000 | |
|---|---|---|---|
| JP | 2005-332130 | 12/2005 | |
| JP | 2008-54267 | 3/2008 | |
| WO | WO2005111933 A1 * | 11/2005 | G06T 5/20 |
| WO | WO 2006/043414 | 4/2006 | |

* cited by examiner

*Primary Examiner* — Matthew Bella
*Assistant Examiner* — Jason Heidemann
(74) *Attorney, Agent, or Firm* — Oblon, Spivak, McClelland, Maier & Neustadt, L.L.P.

(57) ABSTRACT

A correlation judgment part judges a correlation direction on each pixel. In a case where a correlation direction of a specified pixel is a vertical direction and the correlation thereof is small in any other direction, it is judged that the specified pixel is a pixel on an edge in the vertical direction. Then, a noise removal filtering operation is performed on the specified pixel by using pixels on a line in the vertical direction and an edge enhancement operation is performed by using pixels on a line in a horizontal direction.

14 Claims, 10 Drawing Sheets

CORRELATION IS HIGH IN VERTICAL DIRECTION

CORRELATION IS HIGH IN HORIZONTAL DIRECTION

CORRELATION IS HIGH IN DIAGONAL A DIRECTION

CORRELATION IS HIGH IN DIAGONAL B DIRECTION

THERE IS NO CORRELATION IN ANY DIRECTION

CORRELATION IS HIGH IN A PLURALITY OF DIRECTIONS

IMAGE PROCESSING APPARATUS FOR NOISE REMOVAL AND EDGE ENHANCEMENT BASED ON EDGE DIRECTION

BACKGROUND OF THE INVENTION

1. Field of the Invention

The present invention relates to an image processing apparatus for performing a filtering operation such as an edge enhancement operation on a pixel signal.

2. Description of the Background Art

In digital still cameras, digital video cameras, image scanners and the like, various image processings are performed on inputted pixel signals. For example, an edge enhancement operation is performed by extracting high-frequency components from a pixel signal and adding the high-frequency components to the original pixel signal. Further, it is possible to remove noise from a pixel signal by applying an average filter or a median filter to the pixel signal.

When the edge enhancement operation is performed uniformly on pixel signals, however, there arises a problem of enhancing even noise components. Further, when a noise removal is performed by uniformly applying a low-frequency pass filter to the pixel signals, there arises a problem that the sharpness of edge components is deteriorated.

Then, conventionally performed is a method in which an edge component area is extracted from the pixel signals and a noise removal filter is applied to the area other than the edge component area. This method, however, has a problem that noise is left in an area in the vicinity of the edge components.

In International Publication 2006-043414, the applicant of the present invention shows a technique that the correlation direction of a pixel signal is judged and a pixel interpolation operation and a filtering operation related to the correlation direction are performed. Specifically, by using pixels in a direction where the correlation is high, the pixel interpolation operation and the filtering operation are performed. This technique produces an effect of achieving a sharp pixel signal.

SUMMARY OF THE INVENTION

The present invention is intended for an image processing apparatus. According to an aspect of the present invention, the image processing apparatus comprises an input part for inputting a pixel signal, an edge judgment part for judging whether a specified pixel is a pixel on an edge or not by using pixel signals in a predetermined area around the specified pixel and judging the direction of edge in a case where the specified pixel is a pixel on the edge, and a filtering part for performing a filtering operation having characteristics related to the direction of edge in the case where the specified pixel is a pixel on the edge.

By this aspect of the present invention, it is possible to reproduce the edge more sharply.

According to another aspect of the present invention, the filtering part performs a filtering operation having a first characteristic on a first direction in which the correlation is judged to be high on the basis of a predetermined criterion and performs a filtering operation having a second characteristic on a second direction orthogonal to the first direction.

Appropriate filtering operations are performed in a direction where the correlation is high and its orthogonal direction, and this makes it possible to reproduce the edge more sharply.

According to still another aspect of the present invention, the filtering operation having the first characteristic is a noise removal filtering operation using pixels in the first direction and the filtering operation having the second characteristic is an edge enhancement operation using pixels in the second direction.

It thereby becomes possible to remove noise in the direction of edge more clearly and reproduce the edge more sharply.

Therefore, it is an object of the present invention to provide a technique to perform an appropriate filtering operation on pixel signals without any adverse effect of a noise removal operation and an edge enhancement operation to be exerted on each other.

These and other objects, features, aspects and advantages of the present invention will become more apparent from the following detailed description of the present invention when taken in conjunction with the accompanying drawings.

DESCRIPTION OF THE PREFERRED EMBODIMENTS

The First Preferred Embodiment

Figure 1:
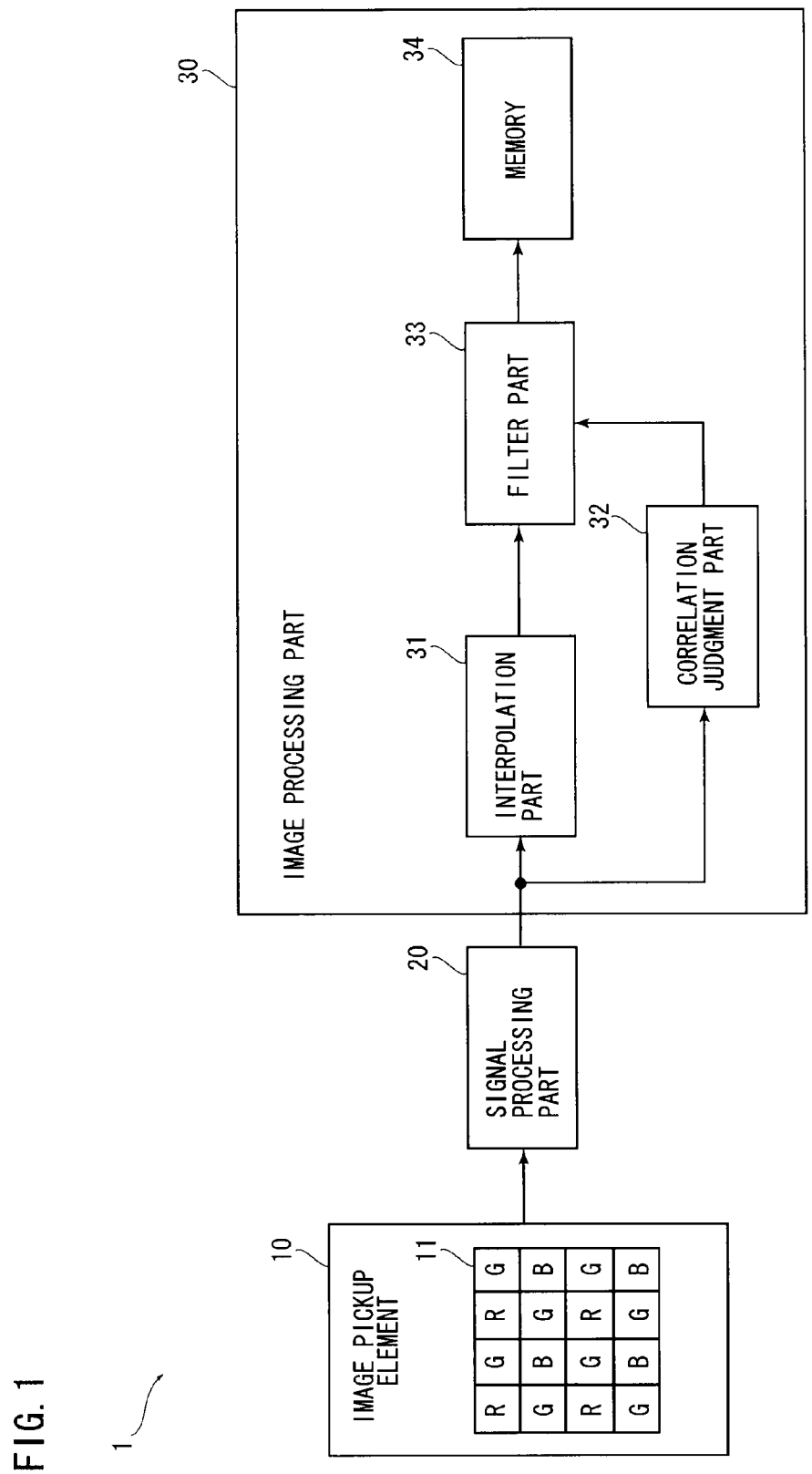
FIG. 1 is a block diagram showing an image pickup apparatus in accordance with preferred embodiments.

Hereinafter, the preferred embodiments of the present invention will be discussed with reference to drawings. FIG. 1 is a block diagram showing an image pickup apparatus 1 in accordance with the preferred embodiments of the present invention. The image pickup apparatus 1 can be applied to, for example, a digital still camera, a digital video camera, an image scanner or the like. The image pickup device 1 comprises an image pickup element 10, a signal processing part 20 and an image processing part 30.

The image pickup element 10 is, for example, a CCD image pickup device, a CMOS sensor or the like and comprises a color filter 11 of single-chip Bayer array to support the RGB color space in the first preferred embodiment.

Figure 2:
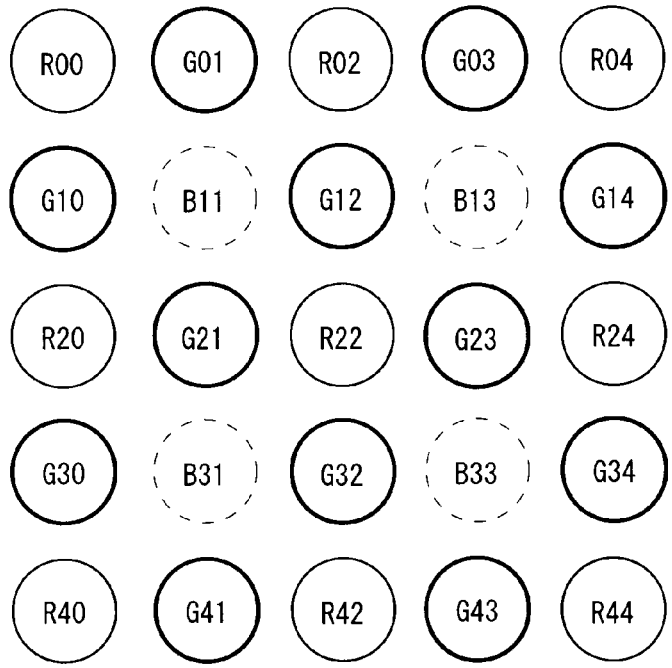
FIG. 2 is a view showing an arrangement of RGB pixel signals outputted from an image pickup element.

Therefore, a pixel signal outputted from the image pickup element 10 is a signal related to any one of color components of R (Red), G (Green) and B (Blue) as shown in FIG. 2. Alternatively, a color filter array for complementary colors (YMCK system) may be used.

In FIG. 2, two numbers follow each of reference signs R (Red), G (Green) and B (Blue) representing the respective color components, and the first number of the two numbers represents a row number of the pixel array and the second number represents a column number of the pixel array. In this exemplary array, pixels of R and G are alternately read out, such as R→G→R→G . . . , in even rows and pixels of G and B are alternately read out, such as G→B→G→B . . . , in odd rows.

In the signal processing part 20, a signal processing (preprocessing) such as white balancing, black level correction or the like is performed on the pixel signal outputted from the image pickup element 10. The pixel signal on which the preprocessing is performed in the signal processing part 20 is transmitted to the image processing part 30.

The pixel signal inputted to the image processing part 30 is inputted to an interpolation part 31 and a correlation judgment part 32. In the interpolation part 31, pixel interpolation is performed on the pixel signal and each pixel becomes a complete pixel signal having all of color components of R, G and B. Further, the correlation judgment part 32 judges a correlation direction of each pixel. The judgment operation on the correlation direction will be discussed in detail later.

After the pixel interpolation, the pixel signal is outputted to a filter part 33. Then, in the filter part 33, a filtering operation is performed in accordance with the judgment on the correlation direction by the correlation judgment part 32. Specifically, the filter part 33 judges whether a specified pixel is a pixel on an edge or not on the basis of the judgment result on the correlation direction by the correlation judgment part 32. Further, the filter part 33 judges the direction of edge. Then, the filter part 33 performs the filtering operation in consideration of whether the specified pixel is a pixel on the edge or not and the direction of edge. After the filtering operation, the pixel signal is stored into a memory 34. Function blocks included in the signal processing part 20 and the image processing part 30 may be constructed of hardware circuits, or part of or all of the function parts may be implemented by software.

<Method of Calculating Correlation Value of Each Pixel>

Figure 3:
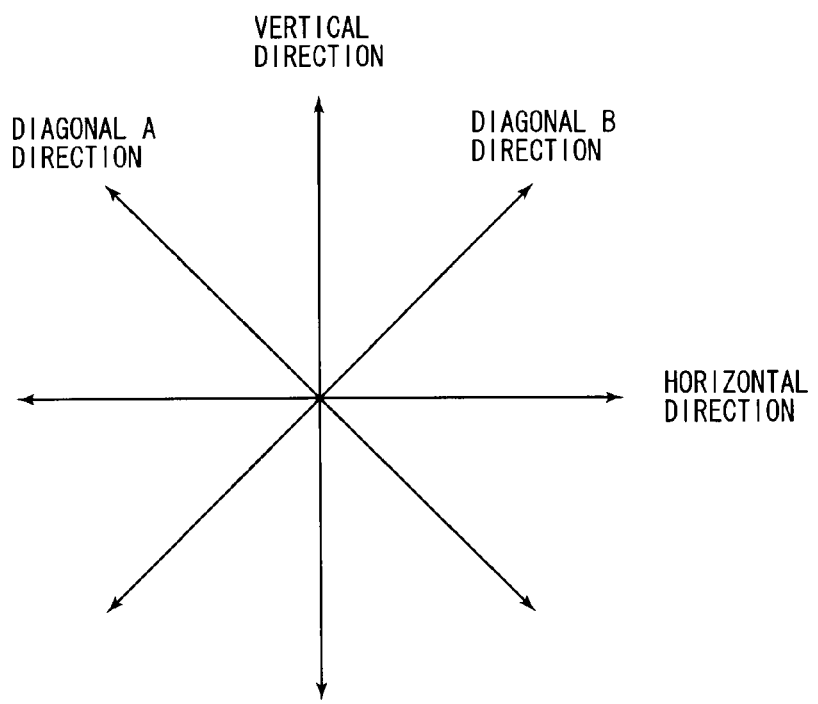
FIG. 3 is a view showing four directions in which correlation values are calculated.

Next, discussion will be made on details of correlation-value calculation in the correlation judgment part 32. FIG. 3 shows four directions in which correlation values for the pixel array of FIG. 2 are calculated. In the first preferred embodiment, the correlation values are calculated in four directions, i.e., a vertical direction, a horizontal direction, a diagonal A direction and a diagonal B direction. The diagonal A direction refers to a direction having the inclination of 45 degrees left-handedly (counterclockwisely) with respect to the vertical direction, and the diagonal B direction refers to a direction having the inclination of 45 degrees right-handedly (clockwisely) with respect to the vertical direction.

In FIGS. 2, 4 and 5, thick solid circles represent G signals, thin solid circles represent R signals and broken-line circles represent B signals. Further, in these figures, representations such as R00, G01 and the like are used as names for identifying pixels while the same representations in Eqs. 1 to 8 indicate respective pixel values of the pixels.

FIGS. 4A to 4D show a method of calculating the correlation values in a case where the specified pixel is a G signal (herein, G22). In the first preferred embodiment, the G signals included in a surrounding area of 5×5 pixels around the specified pixel are used as an object pixels of calculation of the correlation values, but the range of the surrounding area is not particularly limited. Alternatively, a 7×7 area or the like may be used.

Figure 4A:
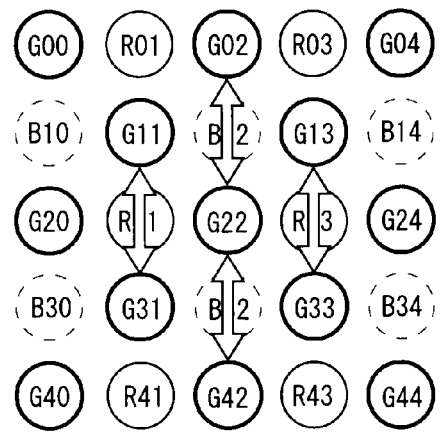
FIGS. 4A to 4D are views showing a method of calculating the correlation values in a case where a specified pixel is a G pixel.

FIG. 4A shows a method of calculating the correlation value (Cvertical) in the vertical direction and an equation for the calculation is Eq. 1.

$$Cvertical = \frac{|G11 - G31| + |G02 - G22| + |G22 - G42| + |G13 - G33|}{4} \quad \text{(Eq. 1)}$$

Specifically, by using respective pixel values of the seven G signals (G11, G31, G02, G22, G42, G13 and G33), pixel differential absolute values of four pairs of these G signals in the vertical direction are calculated and an average value of these pixel differential absolute values is obtained as the correlation value (Cvertical). Then, the smaller the correlation value (Cvertical) is, the higher the correlation in the vertical direction becomes.

Figure 4B:
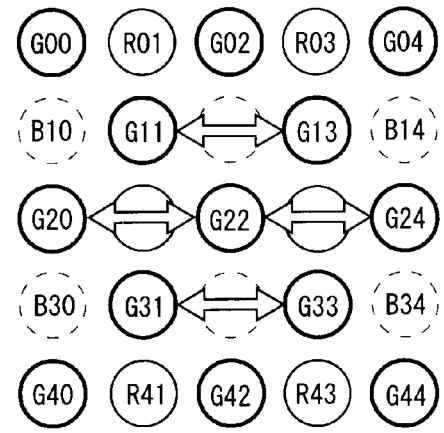

FIG. 4B shows a method of calculating the correlation value (Chorizontal) in the horizontal direction and an equation for the calculation is Eq. 2.

$$Chorizontal = \frac{|G11 - G13| + |G20 - G22| + |G22 - G24| + |G31 - G33|}{4} \quad \text{(Eq. 2)}$$

Specifically, by using respective pixel values of the seven G signals (G11, G13, G20, G22, G24, G31 and G33), pixel differential absolute values of four pairs of these G signals in the horizontal direction are calculated and an average value of these pixel differential absolute values is obtained as the correlation value (Chorizontal). Then, the smaller the correlation value (Chorizontal) is, the higher the correlation in the horizontal direction becomes.

Figure 4C:
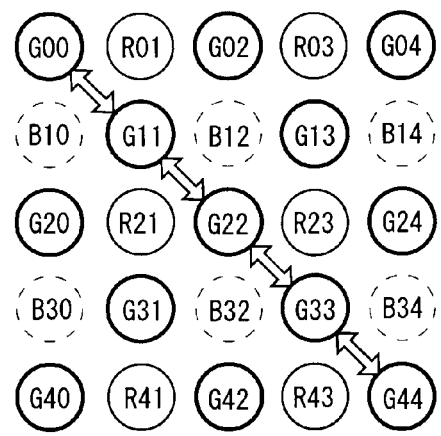

FIG. 4C shows a method of calculating the correlation value (CdiagonalA) in the diagonal A direction and an equation for the calculation is Eq. 3.

$$CdiagonalA = \frac{|G00 - G11| + |G11 - G22| + |G22 - G33| + |G33 - G44|}{4} \quad \text{(Eq. 3)}$$

Specifically, by using respective pixel values of the five G signals (G00, G11, G22, G33 and G44), pixel differential absolute values of four pairs of these G signals in the diagonal A direction are calculated and an average value of these pixel differential absolute values is obtained as the correlation value (CdiagonalA). Then, the smaller the correlation value (CdiagonalA) is, the higher the correlation in the diagonal A direction becomes.

Figure 4D:
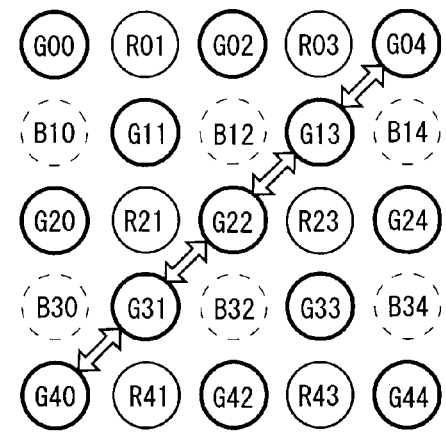

FIG. 4D shows a method of calculating the correlation value (CdiagonalB) in the diagonal B direction and an equation for the calculation is Eq. 4.

$$CdiagonalB = \frac{|G04 - G13| + |G13 - G22| + |G22 - G31| + |G31 - G40|}{4} \quad \text{(Eq. 4)}$$

Specifically, by using respective pixel values of the five G signals (G04, G13, G22, G31 and G40), pixel differential absolute values of four pairs of these G signals in the diagonal B direction are calculated and an average value of these pixel differential absolute values is obtained as the correlation value (CdiagonalB). Then, the smaller the correlation value (CdiagonalB) is, the higher the correlation in the diagonal B direction becomes.

FIGS. 5A to 5D show a method of calculating the correlation values in a case where the specified pixel is an R signal (herein, R22). In the first preferred embodiment, the G signals included in a surrounding area of 5×5 pixels around the specified pixel are used as object pixels of calculation of the correlation values, but the range of the surrounding area is not particularly limited. Alternatively, a 3×3 area, a 7×7 area or the like may be used.

Figure 5A:
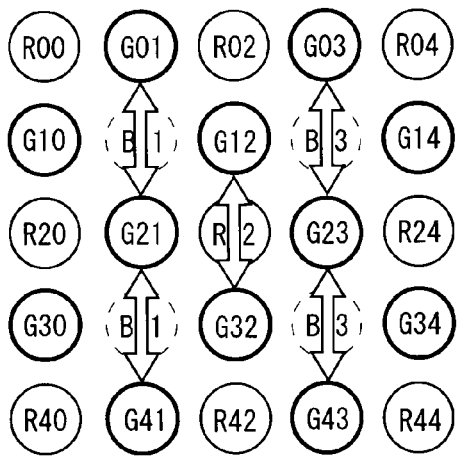
FIGS. 5A to 5D are views showing a method of calculating the correlation values in a case where a specified pixel is an R pixel.

FIG. 5A shows a method of calculating the correlation value (Cvertical) in the vertical direction and an equation for the calculation is Eq. 5.

$$Cvertical = \frac{|G01 - G21| + |G21 - G41| + |G12 - G32| + |G03 - G23| + |G23 - G43|}{5} \quad \text{(Eq. 5)}$$

Specifically, by using respective pixel values of the eight G signals (G01, G21, G41, G12, G32, G03, G23 and G43), pixel differential absolute values of five pairs of these G signals in the vertical direction are calculated and an average value of these pixel differential absolute values is obtained as the correlation value (Cvertical). Then, the smaller the correlation value (Cvertical) is, the higher the correlation in the vertical direction becomes.

Figure 5B:
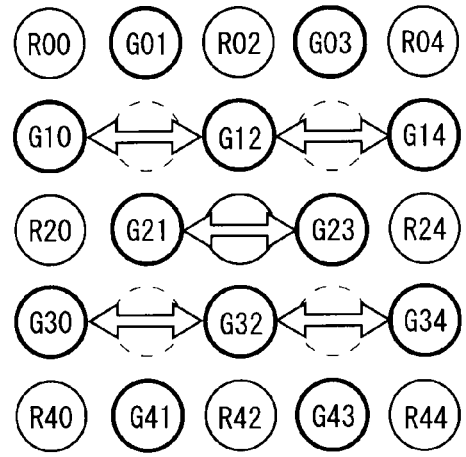

FIG. 5B shows a method of calculating the correlation value (Chorizontal) in the horizontal direction and an equation for the calculation is Eq. 6.

$$Chorizontal = \frac{|G10 - G12| + |G12 - G14| + |G21 - G23| + |G30 - G32| + |G32 - G34|}{5} \quad \text{(Eq. 6)}$$

Specifically, by using respective pixel values of the eight G signals (G10, G12, G14, G21, G23, G30, G32 and G34), pixel differential absolute values of five pairs of these G signals in the horizontal direction are calculated and an average value of these pixel differential absolute values is obtained as the correlation value (Chorizontal). Then, the smaller the correlation value (Chorizontal) is, the higher the correlation in the horizontal direction becomes.

Figure 5C:
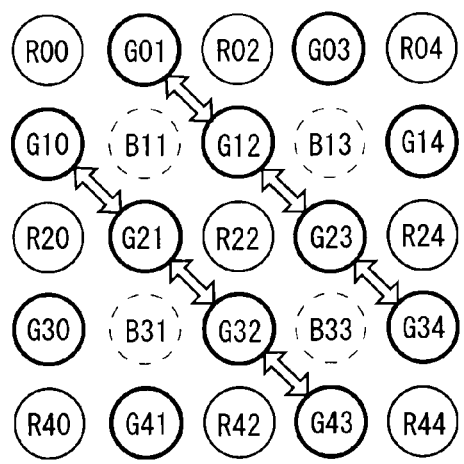

FIG. 5C shows a method of calculating the correlation value (CdiagonalA) in the diagonal A direction and an equation for the calculation is Eq. 7.

$$CdiagonalA = \frac{|G10 - G21| + |G21 - G32| + |G32 - G43| + |G01 - G12| + |G12 - G23| + |G23 - G34|}{6} \quad \text{(Eq. 7)}$$

Specifically, by using respective pixel values of the eight G signals (G10, G21, G32, G43, G01, G12, G23 and G34), pixel differential absolute values of six pairs of these G signals in the diagonal A direction are calculated and an average value of these pixel differential absolute values is obtained as the correlation value (CdiagonalA). Then, the smaller the correlation value (CdiagonalA) is, the higher the correlation in the diagonal A direction becomes.

Figure 5D:
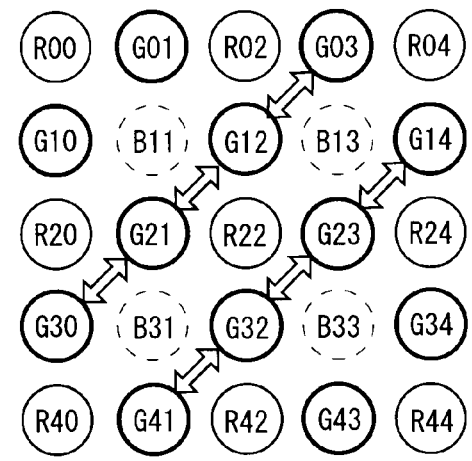

FIG. 5D shows a method of calculating the correlation value (CdiagonalB) in the diagonal B direction and an equation for the calculation is Eq. 8.

$$CdiagonalB = \frac{|G03 - G12| + |G12 - G21| + |G21 - G30| + |G14 - G23| + |G23 - G32| + |G32 - G41|}{6} \quad \text{(Eq. 8)}$$

Specifically, by using respective pixel values of the eight G signals (G03, G12, G21, G30, G14, G23, G32 and G41), pixel differential absolute values of six pairs of these G signals in the diagonal B direction are calculated and an average value of these pixel differential absolute values is obtained as the correlation value (CdiagonalB). Then, the smaller the correlation value (CdiagonalB) is, the higher the correlation in the diagonal B direction becomes.

A method of calculating the correlation values in a case where the specified pixel is a B signal is the same as that in the case where the specified pixel is an R signal. Specifically, in FIGS. 5A to 5D, by replacing the R signal with a B signal and using Eqs. 5 to 8 in the same manner, it is possible to calculate the correlation values in the horizontal direction, vertical direction, diagonal A direction and diagonal B direction.

<Judgment on Correlation Direction of Each Pixel>

After the correlation values in the four directions are calculated by the above-discussed methods, the correlation judgment part 32 judges that the direction in which the correlation value is smallest is a correlation direction of the specified pixel. Alternatively, the correlation judgment part 32 judges that the direction in which the correlation value is smallest and the correlation value is smaller than a predetermined threshold value is a correlation direction of the specified pixel. Further, the correlation judgment part 32 judges that there is no correlation in any direction if there is no direction in which the correlation value is smaller than the predetermined threshold value. Conversely, if the correlation values are smaller than the predetermined threshold value in a plurality of directions (or in all the directions), the correlation judgment part 32 judges that the correlation is high in a plurality of directions.

Figure 6:
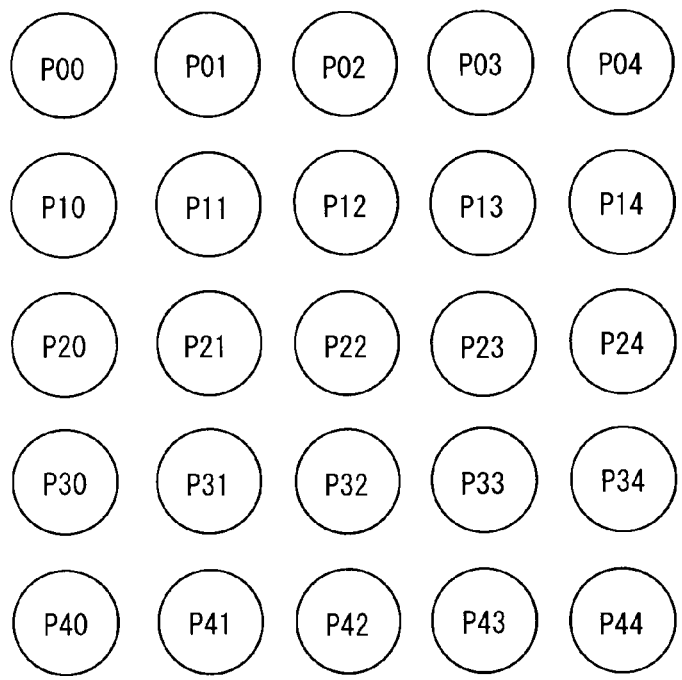
FIG. 6 is a view showing a pixel array of 5×5 square area.

The correlation judgment part 32 determines the correlation direction of each pixel in a 5×5 square area as shown in FIG. 6 by the above-discussed procedure. Specifically, the correlation judgment part 32 determines respective correlation directions of surrounding 25 pixels (P00 to P44) including the specified pixel P22 and pixels around it. In FIG. 6, each pixel is represented by using reference sign "P" since the color components of R, G and B are not taken into account.

Figure 7:
FIG. 7 is a view showing reference signs representing correlation directions.
Figure 7:
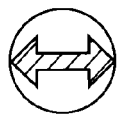
Figure 7:
Figure 7:
Figure 7:
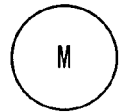
Figure 7:
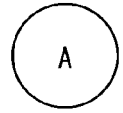

FIG. 7 shows reference signs to be used for the following discussion. The double-headed arrow in the vertical direction represents a pixel which is judged that its correlation is high in the vertical direction (its correlation direction is the vertical direction). The double-headed arrow in the horizontal direction represents a pixel which is judged that its correlation is high in the horizontal direction (its correlation direction is the horizontal direction). The double-headed right downward arrow represents a pixel which is judged that its correlation is high in the diagonal A direction (its correlation direction is the diagonal A direction). The double-headed right upward arrow represents a pixel which is judged that its correlation is high in the diagonal B direction (its correlation direction is the diagonal B direction). The reference sign "M" represents a pixel which is judged to have no correlation in any direction and the reference sign "A" represents a pixel which is judged that its correlation is high in a plurality of directions (or in all the directions).

<Judgment on Corrected Correlation Direction Taking Surrounding Pixels into Account>

Next, the correlation judgment part 32 counts the number of pixels out of the surrounding 25 pixels by determined correlation direction, to determine a corrected correlation direction on the specified pixel. In other words, the correlation judgment part 32 counts the number of occurrences of the determined correlation directions in the surrounding 25 pixels. Specifically, the correlation directions of the pixels are judged by the methods discussed referring to FIGS. 4A to 4D and 5A to 5D, and further the number of pixels out of the surrounding 25 pixels is counted by correlation direction, to correct the correlation direction on the specified pixel. Three methods for determining the correct correlation direction will be discussed below.

As the first method, the number of pixels out of the surrounding 25 pixels with respect to the specified pixel is counted by correlation direction, and the correlation direction which has the highest frequency of occurrence is adopted.

Figure 8:
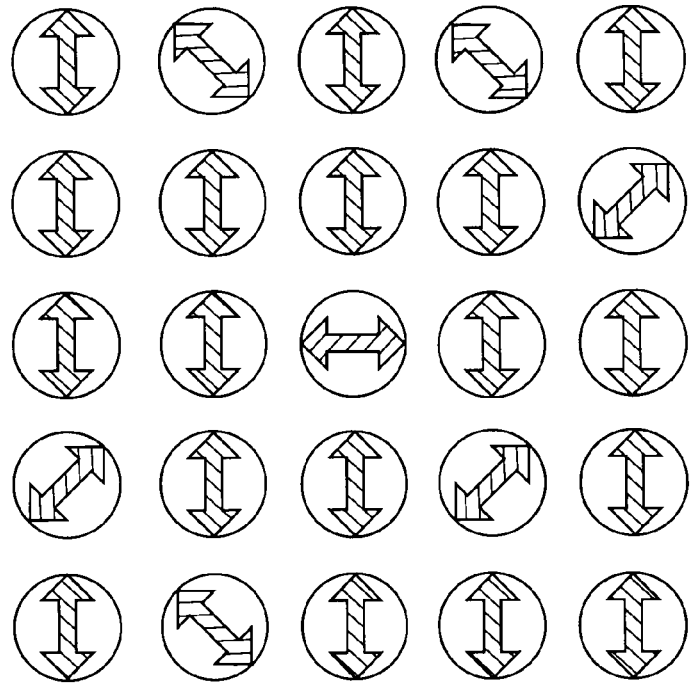
FIGS. 8 to 10 are views each showing a distribution of correlation directions in a 5×5 square area.

In the exemplary case of FIG. 8, in the 5×5 square area, there are 18 pixels which are judged that their correlations are high in the vertical direction, 1 pixel which is judged that its correlation is high in the horizontal direction, 3 pixels which are judged that their correlations are high in the diagonal A direction and 3 pixels which are judged that their correlations are high in the diagonal B direction. In this case, since the number of pixels which are judged that their correlations are high in the vertical direction is largest, it is judged that the corrected correlation direction on the specified pixel (P22) is the vertical direction.

Though the correlation direction which has the highest frequency of occurrence is adopted in the above method, there may be a method in which an appropriate threshold value is set and only if the frequency of occurrence exceeds the threshold value, the correlation direction which has the highest frequency of occurrence is adopted. For example, there may be a case where only if the frequency of occurrence exceeds the majority, the correlation direction which has the highest frequency of occurrence is adopted. Then, if the frequency of occurrence of the correlation direction, which is the highest one, does not exceed the threshold value, the second or third method discussed later may be adopted.

Now, the second method will be discussed. In the second method, the surrounding 25 pixels with respect to the specified pixel are each weighted in accordance with the positional relation with respect to the specified pixel and the frequency of occurrence of each correlation direction is counted while taking into account each weighted value, and then the correlation direction which has the highest frequency of occurrence is adopted.

Figure 9:
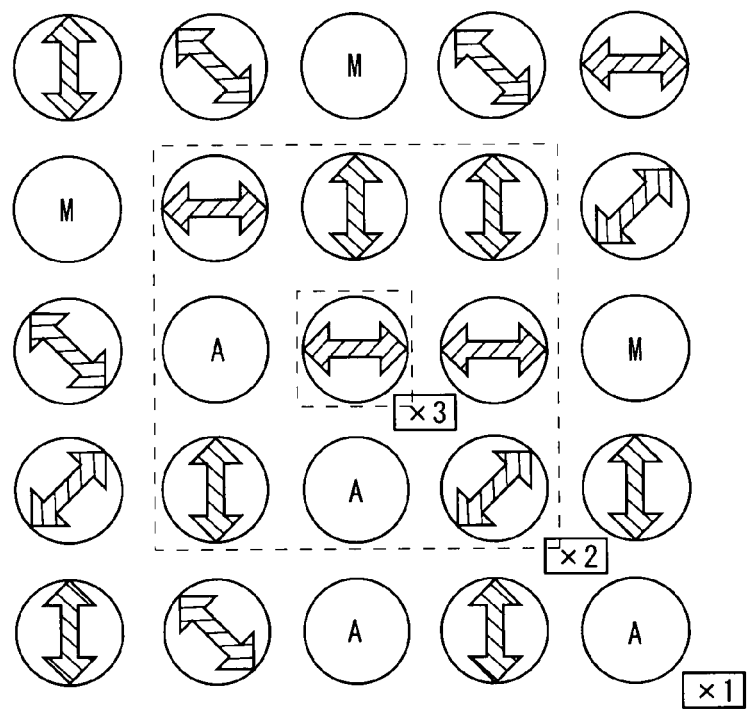

In the exemplary case of FIG. 9, in the 5×5 square area, it is assumed that the weighting factor for the specified pixel is 3, the weighting factor for the surrounding 8 pixels adjacent to the specified pixel is 2 and the weighting factor for the peripheral 16 pixels is 1. When the frequency of occurrence of each correlation direction taking the weighting factor into account is thereby counted, there are 10 pixels which are judged that their correlations are high in the vertical direction (2×3 pixels+1×4 pixels), 8 pixels which are judged that their correlations are high in the horizontal direction (3×1 pixel+2×2 pixels+1×1 pixel), 4 pixels which are judged that their correlations are high in the diagonal A direction (1×4 pixels), 4 pixels which are judged that their correlations are high in the diagonal B direction (2×1 pixel+1×2 pixels), 3 pixels which are judged to have no correlation in any direction (1×3 pixels) and 6 pixels which are judged that their correlations are high in a plurality of directions (2×2 pixels+1×2 pixels). In this case, since the weighted frequency of occurrence of pixels which are judged that their correlations are high in the vertical direction is largest, it is judged that the corrected correlation direction on the specified pixel (P22) is the vertical direction.

Next, the third method will be discussed. In the third method, on a plurality of pixels in the surrounding area of the specified pixel, whether the direction connecting the specified pixel and each of the surrounding pixels coincides with the correlation direction or not is used as a reference, and the frequency of occurrence of coincidences is counted by correlation direction. For example, when the pixels in the 5×5 square area are used, as shown in FIG. 10, assuming that an area consisting of 5 pixels in the vertical direction is a vertical area VA, an area consisting of 5 pixels in the horizontal direction is a horizontal area HA, an area consisting of 5 pixels in the diagonal A direction is an area LA and an area consisting of 5 pixels in the diagonal B direction is an area RA, the number of coincidences between the area direction and the correlation directions of the pixels included in each of the areas VA, HA, LA and RA is counted.

Figure 10:
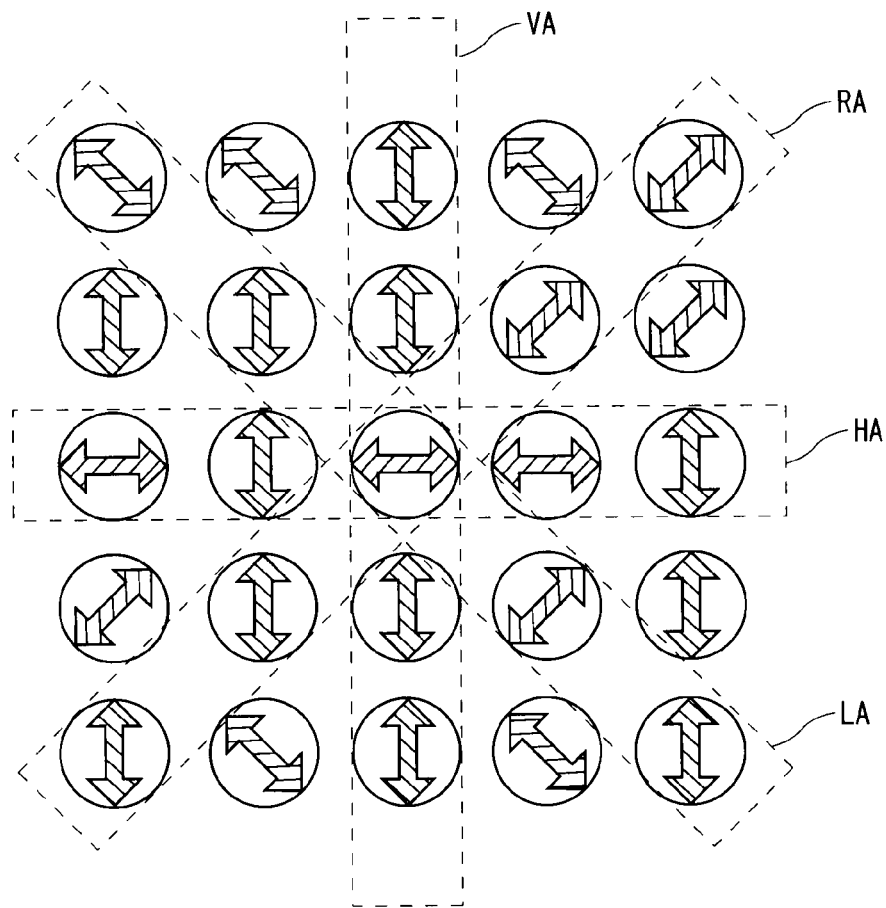

In the exemplary case of FIG. 10, when the number of coincidences between the area direction and the correlation directions of the pixels included in each area is counted, there are 4 pixels in the vertical area VA (that is, 4 pixels in the vertical area VA which are judged that their correlations are high in the vertical direction), 3 pixels in the horizontal area HA, 1 pixel in the area LA and 2 pixels in the area RA. In this case, since the number of pixels whose correlation directions coincide with the area direction is largest in the vertical area VA, it is judged that the corrected correlation direction on the specified pixel (P22) is the vertical direction.

There may be another method, taking the idea of the second method into the third method, where the pixels in each of the areas VA, HA, LA and RA are each weighted in accordance with the positional relation with respect to the specified pixel and the number of coincidences is counted by correlation direction while taking into account weighted value.

<Filtering Operation>

After the corrected correlation direction on each specified pixel is determined by any one of the above-discussed methods, the filter part 33 performs a filtering operation in accordance with the corrected correlation direction. The filter part 33 determines a filter factor on the basis of the judgment result on the correlation direction of each pixel and the judgment result on the corrected correlation direction on the pixel and sets the filter factor in a corresponding tap. Specifically, the filter part 33 of the first preferred embodiment is formed of a single filter circuit and rewrites the filter factor in real time to operate as a filter having a different characteristic in a switching manner. The filtering operation discussed below is performed on a pixel signal after the pixel interpolation. In other words, each pixel is a complete pixel signal having all of color components of R, G and B. Therefore, the filtering operation discussed below is performed commonly on the pixel signals of R, G and B. Alternatively, the filtering operation may be performed on some of the components, instead of all the components of R, G and B.

(In a Case where Specified Pixel is Judged to Exist on Edge in Vertical Direction)

In a case where the corrected correlation direction on the specified pixel is the vertical direction and the correlation of the specified pixel is small in any other direction, the specified pixel is judged to be a pixel on an edge in the vertical direction. The case where the correlation of the specified pixel in any other direction is small refers to a case where the correlation values of the specified pixel in the horizontal direction, diagonal A direction and diagonal B direction are larger than the predetermined threshold value. In other words, if the correlation in the vertical direction is high and that in any other direction is small, the specified pixel is judged to exist on an edge in the vertical direction. It is assumed, for example, that the specified pixel exists on a boundary of a line in the vertical direction, and so on.

Figure 11:
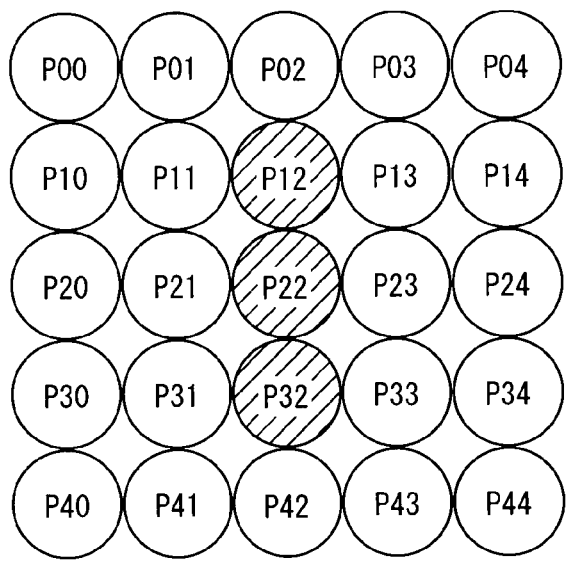
FIG. 11 is a view showing pixels used for a filter to be applied to an edge in a vertical direction.

In this case, a noise removal operation using three pixels in the vertical direction is performed on the specified pixel as shown in FIG. 11. Specifically, the filter part 33 performs a filtering operation expressed by Eq. 9.

$$Q22=(P12+2*P22+P32)/4 \qquad \text{(Eq. 9)}$$

Further, the filter part 33 performs an edge enhancement operation expressed by Eq. 10. In Eq. 10, (**P21+P23−2\*P22**) is a Laplacian component and by subtracting this component from the original signal, an edge component is enhanced. Further, in Eq. 10, k is a real number not smaller than 0 and not larger than 1, serving as a factor to adjust the degree of edge enhancement. The larger k is, the more the edge component is enhanced.

$$R22=P22-(P21+P23-2*P22)*k \qquad \text{(Eq. 10)}$$

The filter part 33 performs two types of filtering operations expressed by Eqs. 9 and 10, and there are possible two patterns for the combination of the two filtering operations such as expressed by Eq. 11 and Eq. 12.

$$\begin{cases} Q22 = (P12+2*P22+P32)/4 \\ R22 = Q22 - (P21+P23-2*P22)*k \end{cases} \qquad \text{(Eq. 11)}$$

In Eq. 11, on one line in the vertical direction, the noise removal operation is performed, and then the edge enhancement operation is performed in the horizontal direction. Though the value of "2\*P22" out of the Laplacian component is subtracted in this case, the value of "2\*Q22" may be subtracted.

$$\begin{cases} Q21 = (P11+2*P21+P31)/4 \\ Q22 = (P12+2*P22+P32)/4 \\ Q23 = (P13+2*P23+P33)/4 \\ R22 = Q22 - (Q21+Q23-2*Q22)*k \end{cases} \qquad \text{(Eq. 12)}$$

In Eq. 12, on three lines in the vertical direction, the noise removal operation is performed. Specifically, the noise removal operation is performed also on the lines adjacent to the line which is judged to be the edge. Then, the edge enhancement operation is performed in the horizontal direction. Though the value of "2*Q22" out of the Laplacian component is subtracted in this case, the value of "2\*P22" may be subtracted.

Thus, when the specified pixel is judged to exist on an edge in the vertical direction, since the noise removal operation is performed by using the points on the line in the vertical direction, it is possible to perform noise removal on an edge area by using appropriate pixels. Then, since the edge enhancement operation is performed after the noise removal using the appropriate pixels, it is possible to achieve a sharper image.

An operation in a case where the specified pixel is judged to exist on an edge in the horizontal direction is the same one. After the noise removal operation is performed on one line or three lines in the horizontal direction by using the pixels in the horizontal direction, the edge enhancement operation is performed by using the pixels in the vertical direction.

(In a Case where Specified Pixel is Judged to Exist on Edge in Diagonal a Direction)

In a case where the corrected correlation direction on the specified pixel is the diagonal A direction and the correlation of the specified pixel is small in any other direction, the specified pixel is judged to be a pixel on an edge in the diagonal A direction. The case where the correlation of the specified pixel in any other direction is small refers to a case where the correlation values of the specified pixel in the vertical direction, horizontal direction and diagonal B direction are larger than the predetermined threshold value. In other words, if the correlation in the diagonal A direction is high and that in any other direction is small, the specified pixel is judged to exist on an edge in the diagonal A direction. It is assumed, for example, that the specified pixel exists on a boundary of a line in the diagonal A direction, and so on.

Figure 12:
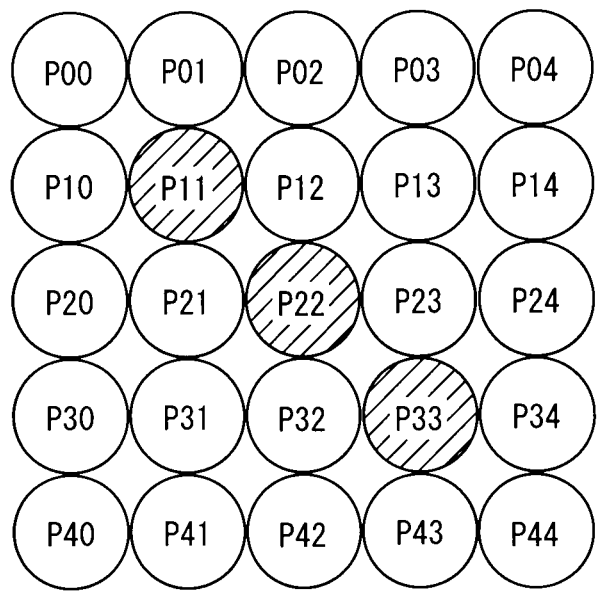
FIG. 12 is a view showing pixels used for a filter to be applied to an edge in a diagonal A direction.

In this case, a noise removal operation using three pixels in the diagonal A direction is performed on the specified pixel as shown in FIG. 12. Specifically, the filter part 33 performs a filtering operation expressed by Eq. 13.

$$Q22=(P11+2*P22+P33)/4 \qquad \text{(Eq. 13)}$$

Further, the filter part 33 performs an edge enhancement operation expressed by Eq. 14. In Eq. 14, (**P13+P31−2\*P22**) is a Laplacian component. Further, in Eq. 14, k is a real number not smaller than 0 and not larger than 1, serving as a factor to adjust the degree of edge enhancement.

$$R22=P22-(P13+P31-2*P22)*k \qquad \text{(Eq. 14)}$$

The filter part 33 performs two types of filtering operations expressed by Eqs. 13 and 14, and there are possible three patterns for the combination of the two filtering operations such as expressed by Eq. 15, Eq. 16 and Eq. 17.

$$\begin{cases} Q22 = (P11+2*P22+P33)/4 \\ R22 = Q22 - (P13+P31-2*P22)*k \end{cases} \qquad \text{(Eq. 15)}$$

In Eq. 15, on one line in the diagonal A direction, the noise removal operation is performed, and then the edge enhancement operation is performed in the diagonal B direction. Though the value of "2\*P22" out of the Laplacian component is subtracted in this case, the value of "2*Q22" may be subtracted.

$$\begin{cases} Q_a = (P12+P23)/2 \\ Q22 = (P11+2*P22+P33)/4 \\ Q_b = (P21+P32)/2 \\ R22 = Q22 - (Q_a+Q_b-2*Q22)*k \end{cases} \qquad \text{(Eq. 16)}$$

In Eq. 16, on three lines in the diagonal A direction, the noise removal operation is performed. Specifically, the noise removal operation is performed also on the lines adjacent to the line which is judged to be the edge. Then, the edge enhancement operation is performed in the diagonal B direction. Though the value of "2*Q22" out of the Laplacian component is subtracted in this case, the value of "2\*P22" may be subtracted.

$$\begin{cases} Q13 = (P02 + 2*P13 + P24)/4 \\ Q22 = (P11 + 2*P22 + P33)/4 \\ Q31 = (P20 + 2*P31 + P42)/4 \\ R22 = Q22 - (Q13 + Q31 - 2*Q22)*k \end{cases} \quad \text{(Eq. 17)}$$

Also in Eq. 17, on three lines in the diagonal A direction, the noise removal operation is performed. The filter expressed by Eq. 17, however, uses pixels slightly away from the specified pixel as compared with the filter expressed by Eq. 16. Then, the edge enhancement operation is performed in the diagonal B direction. Though the value of "2*Q22" out of the Laplacian component is subtracted in this case, the value of "2*P22" may be subtracted.

Thus, when the specified pixel is judged to exist on an edge in the diagonal A direction, since the noise removal operation is performed by using the points on the line in the diagonal A direction, it is possible to perform noise removal on an edge area by using appropriate pixels. Then, since the edge enhancement operation is performed by using the pixels in the diagonal B direction after the noise removal using the appropriate pixels, it is possible to achieve a sharper image.

An operation in a case where the specified pixel is judged to exist on an edge in the diagonal B direction is the same one. After the noise removal operation is performed on one line or three lines in the diagonal B direction by using the pixels in the diagonal B direction, the edge enhancement operation is performed by using the pixels in the diagonal A direction.

The Second Preferred Embodiment

A constitution and the like of an image pickup apparatus 1 in accordance with the second preferred embodiment is the same as that in the first preferred embodiment. Further, the methods of calculating the correlation values, judging the correlation direction, judging the corrected correlation direction and the like are also the same as those in the first preferred embodiment. The second preferred embodiment is different from the first preferred embodiment in details of filtering operations.

(In a Case where Specified Pixel is Judged to Exist on Edge in Vertical Direction)

In a case where the corrected correlation direction on the specified pixel is the vertical direction and the correlation of the specified pixel is small in any other direction, the specified pixel is judged to exist on an edge in the vertical direction. Further, in the second preferred embodiment, it is also judged whether the correlation in the horizontal direction orthogonal to the vertical direction is smallest or not. The case where the correlation in the horizontal direction is smallest refers to a case where the correlation value calculated in the horizontal direction is largest.

Figure 13:
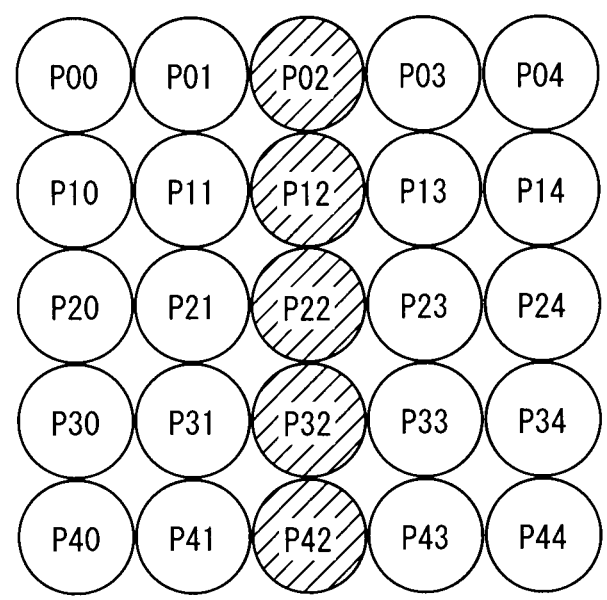
FIG. 13 is a view showing pixels used for a filter to be applied to an edge in the vertical direction.

In the case where the corrected correlation direction on the specified pixel is the vertical direction and the correlation in the horizontal direction is smallest among those in all the directions, a noise removal operation using five pixels in the vertical direction is performed on the specified pixel as shown in FIG. 13. Specifically, the filter part 33 performs a filtering operation expressed by Eq. 18.

$$Q22=(P02+2*P12+6*P22+2*P32+P42)/12 \quad \text{(Eq. 18)}$$

Further, the filter part 33 performs an edge enhancement operation expressed by Eq. 19. In Eq. 19, (P21+P23−2*P22) is a Laplacian component. Further, in Eq. 19, k is a real number not smaller than 0 and not larger than 1, serving as a factor to adjust the degree of edge enhancement.

$$R22=P22-(P21+P23-2*P22)*k \quad \text{(Eq. 19)}$$

The filter part 33 performs two types of filtering operations expressed by Eqs. 18 and 19, and there are possible two patterns for the combination of the two filtering operations such as expressed by Eq. 20 and Eq. 21.

$$\begin{cases} Q22 = (P02 + 2*P12 + 6*P22 + 2*P32 + P42)/12 \\ R22 = Q22 - (P21 + P23 - 2*P22)*k \end{cases} \quad \text{(Eq. 20)}$$

In Eq. 20, on one line in the vertical direction, the noise removal operation is performed, and then the edge enhancement operation is performed in the horizontal direction. Thus, since five pixels in the vertical direction are used, it is possible to more effectively remove noise in the direction of edge. Though the value of "2*P22" out of the Laplacian component is subtracted in this case, the value of "2*Q22" may be subtracted.

$$\begin{cases} Q21 = (P01 + 2*P11 + 6*P21 + 2*P31 + P41)/12 \\ Q22 = (P02 + 2*P12 + 6*P22 + 2*P32 + P42)/12 \\ Q23 = (P03 + 2*P13 + 6*P23 + 2*P33 + P43)/12 \\ R22 = Q22 - (Q21 + Q23 - 2*Q22)*k \end{cases} \quad \text{(Eq. 21)}$$

In Eq. 21, on three lines in the vertical direction, the noise removal operation is performed. Specifically, the noise removal operation is performed also on the lines adjacent to the line which is judged to be the edge. Then, the edge enhancement operation is performed in the horizontal direction. Similarly, since five pixels in the vertical direction are used, it is possible to more effectively remove noise in the direction of edge. Though the value of "2*Q22" out of the Laplacian component is subtracted in this case, the value of "2*P22" may be subtracted.

Thus, when it is judged that specified pixel exists on an edge in the vertical direction and the correlation in the horizontal direction orthogonal to the vertical direction is smallest, since the noise removal operation is performed by using the points in a wide range on the line in the vertical direction, it is possible to perform noise removal more effectively on an edge area. Then, since the edge enhancement operation is performed after the noise removal using the appropriate pixels, it is possible to achieve a sharper image.

On the other hand, in a case where the corrected correlation direction on the specified pixel is the vertical direction and the correlation in the horizontal direction is not smallest, the filtering operation discussed in the first preferred embodiment is performed. Specifically, the noise removal operation is performed by using three pixels in the vertical direction and then the edge enhancement operation is performed in the horizontal direction. In other words, in a case where the degree of edge is very large, the noise removal operation using five pixels in a wide range is performed as discussed in the second preferred embodiment and in a case where the degree of edge is relatively small, the noise removal operation using three pixels is performed.

Further, an operation in a case where it is judged that the specified pixel exists on an edge in the horizontal direction and the correlation in the vertical direction is smallest is the same one. After the noise removal operation is performed on one line or three lines in the horizontal direction by using the pixels in a wider range (five pixels in this preferred embodiment) in the horizontal direction, the edge enhancement operation is performed by using the pixels in the vertical direction. Furthermore, an operation in a case where the corrected correlation direction on the specified pixel is the horizontal direction and the correlation in the vertical direction is not smallest is also the same one. The filtering operation discussed in the first preferred embodiment is performed.

(In a Case where Specified Pixel is Judged to Exist on Edge in Diagonal a Direction)

In a case where the corrected correlation direction on the specified pixel is the diagonal A direction and the correlation of the specified pixel is small in any other direction, the specified pixel is judged to be a pixel on an edge in the diagonal A direction. Further, in the second preferred embodiment, it is also judged whether the correlation in the diagonal B direction orthogonal to the diagonal A direction is smallest or not. The case where the correlation in the diagonal B direction is smallest refers to a case where the correlation value calculated in the diagonal B direction is largest.

Figure 14:
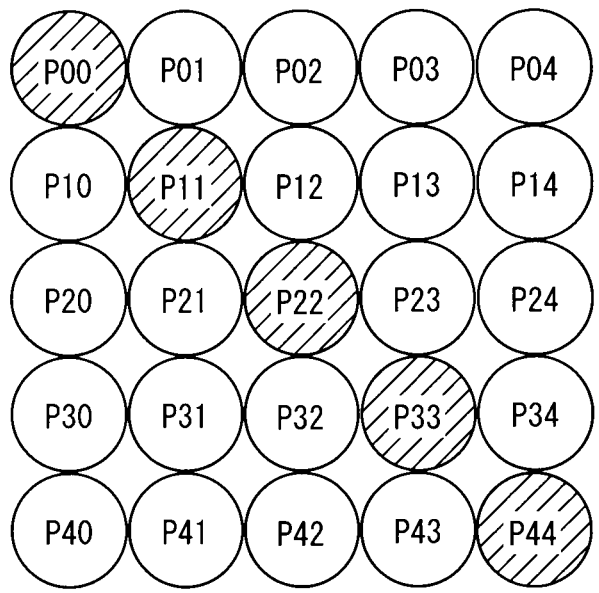
FIG. 14 is a view showing pixels used for a filter to be applied to an edge in the diagonal A direction.

In the case where the corrected correlation direction on the specified pixel is the diagonal A direction and the correlation in the diagonal B direction is smallest among those in all the directions, a noise removal operation using five pixels in the diagonal A direction is performed on the specified pixel as shown in FIG. 14. Specifically, the filter part 33 performs a filtering operation expressed by Eq. 22.

$$Q22=(P00+2*P11+6*P22+2*P33+P44)/12 \quad \text{(Eq. 22)}$$

Further, the filter part 33 performs an edge enhancement operation expressed by Eq. 23. In Eq. 23, (P13+P31−2*P22) is a Laplacian component. Further, in Eq. 23, k is a real number not smaller than 0 and not larger than 1, serving as a factor to adjust the degree of edge enhancement.

$$R22=P22-(P13+P31-2*P22)*k \quad \text{(Eq. 23)}$$

The filter part 33 performs two types of filtering operations expressed by Eqs. 22 and 23, and there are possible two patterns for the combination of the two filtering operations such as expressed by Eq. 24 and Eq. 25.

$$\begin{cases} Q22 = (P00+2*P11+6*P22+2*P33+P44)/12 \\ R22 = Q22-(P13+P31-2*P22)*k \end{cases} \quad \text{(Eq. 24)}$$

In Eq. 24, on one line in the diagonal A direction, the noise removal operation is performed, and then the edge enhancement operation is performed in the diagonal B direction. Thus, since five pixels in the diagonal A direction are used, it is possible to more effectively remove noise in the direction of edge. Though the value of "2*P22" out of the Laplacian component is subtracted in this case, the value of "2*Q22" may be subtracted.

$$\begin{cases} Q_a = (P01+2*P12+2*P23+P34)/6 \\ Q22 = (P00+2*P11+6*P22+2*P33+P44)/12 \\ Q_b = (P10+2*P21+2*P32+P43)/6 \\ R22 = Q22-(Q_a+Q_b-2*Q22)*k \end{cases} \quad \text{(Eq. 25)}$$

In Eq. 25, on three lines in the diagonal A direction, the noise removal operation is performed. Specifically, the noise removal operation is performed also on the lines adjacent to the line which is judged to be the edge. Then, the edge enhancement operation is performed in the diagonal B direction. Similarly, since five pixels (three pixels with respect to the adjacent lines) in the diagonal A direction are used, it is possible to more effectively remove noise in the direction of edge. Though the value of "2*Q22" out of the Laplacian component is subtracted in this case, the value of "2*P22" may be subtracted.

Thus, when it is judged that specified pixel exists on an edge in the diagonal A direction and the correlation in the diagonal B direction orthogonal to the diagonal A direction is smallest, since the noise removal operation is performed by using the points in a wide range on the line in the diagonal A direction, it is possible to perform noise removal more effectively on an edge area. Then, since the edge enhancement operation is performed after the noise removal using the appropriate pixels, it is possible to achieve a sharper image.

On the other hand, in a case where the corrected correlation direction on the specified pixel is the diagonal A direction and the correlation in the diagonal B direction is not smallest, the filtering operation discussed in the first preferred embodiment is performed. For example, the noise removal operation is performed by using three pixels in the diagonal A direction and then the edge enhancement operation is performed in the diagonal B direction. In other words, in a case where the degree of edge is very large, the noise removal operation using pixels in a wide range (e.g., five pixels) is performed as discussed in the second preferred embodiment and in a case where the degree of edge is relatively small, the noise removal operation using pixels in a relatively narrow range (e.g., three pixels) is performed.

Further, an operation in a case where it is judged that the specified pixel exists on an edge in the diagonal B direction and the correlation in the diagonal A direction is smallest is the same one. After the noise removal operation is performed on one line or three lines in the diagonal B direction by using the pixels in a wider range in the diagonal B direction, the edge enhancement operation is performed by using the pixels in the diagonal A direction. Furthermore, an operation in a case where the corrected correlation direction on the specified pixel is the diagonal B direction and the correlation in the diagonal A direction is not smallest is also the same one. The filtering operation discussed in the first preferred embodiment is performed.

Other Preferred Embodiment

Figure 15:
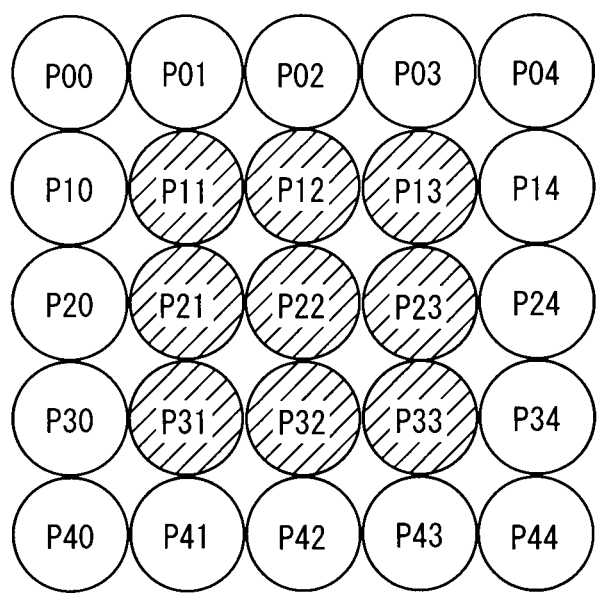
FIG. 15 is a view showing pixels used for a filter to be applied in a case where the correlation is high in a plurality of directions.

In the first or second preferred embodiment, discussion has been made on the filtering operations applied to the case where there is a strong correlation in any one of the four directions and the specified pixel is an pixel on an edge. On the other hand, there is a case where the correlation on the specified pixel is high in a plurality of directions or all the directions. Specifically, this is a case where the correlation values in a plurality of or all of the vertical direction, horizontal direction, diagonal A direction and diagonal B direction are lower than the predetermined threshold value. In this case, as shown in FIG. 15, a 3×3 square area around the specified pixel is used and an average filter expressed by Eq. 26 is applied. Alternatively, one of other LPFs (low pass filters) is used for smoothing.

$$Q22=(P11+P12+P13+P21+P22+P23+P31+P32+P33)/9 \quad \text{(Eq. 26)}$$

There may be another method in which each pixel is weighted in accordance with the distance from the specified pixel and a filter expressed by Eq. 27 is applied.

$$Q22=(P11+2*P12+P13+2*P21+4*P22+2*P23+P31+2*P32+P33)/16 \quad \text{(Eq. 27)}$$

On the other hand, there is a case where the correlation of the specified pixel is small in any direction. In other words, this is a case where the correlation values in all of the vertical direction, horizontal direction, diagonal A direction and diagonal B direction are larger than the predetermined threshold value. In this case, for example, as expressed by Eq. 28, the pixel value of the specified pixel, especially, is not changed. This may be applied to, for example, an image having a lot of fine patterns.

$$Q22=P22 \tag{Eq. 28}$$

On the other hand, the case where the correlation of the specified pixel is small in any direction is, for example, a case where the specified pixel is an isolated point. In such a case, an average filter expressed by Eq. 26 or 27 may be used. This effectively serves even for an image having a lot of noise. Alternatively, as expressed by Eq. 29, a median filter may be applied by using pixels in the 3×3 square area or the like.

$$Q22=\text{medium}(P11,P12,P13,P21,P22,P23,P31,P32,P33) \tag{Eq. 29}$$

In the above preferred embodiments, the case where pixel interpolation is performed in the image pickup apparatus 1 has been discussed as an example. Specifically, the image pickup element 10 comprises the single-chip color filter 11 and outputs pixel signals of Bayer array. The present invention, however, can be surely applied to a case where pixel signals inputted in the image processing part 30 have all the color components of R, G and B.

Figure 16:
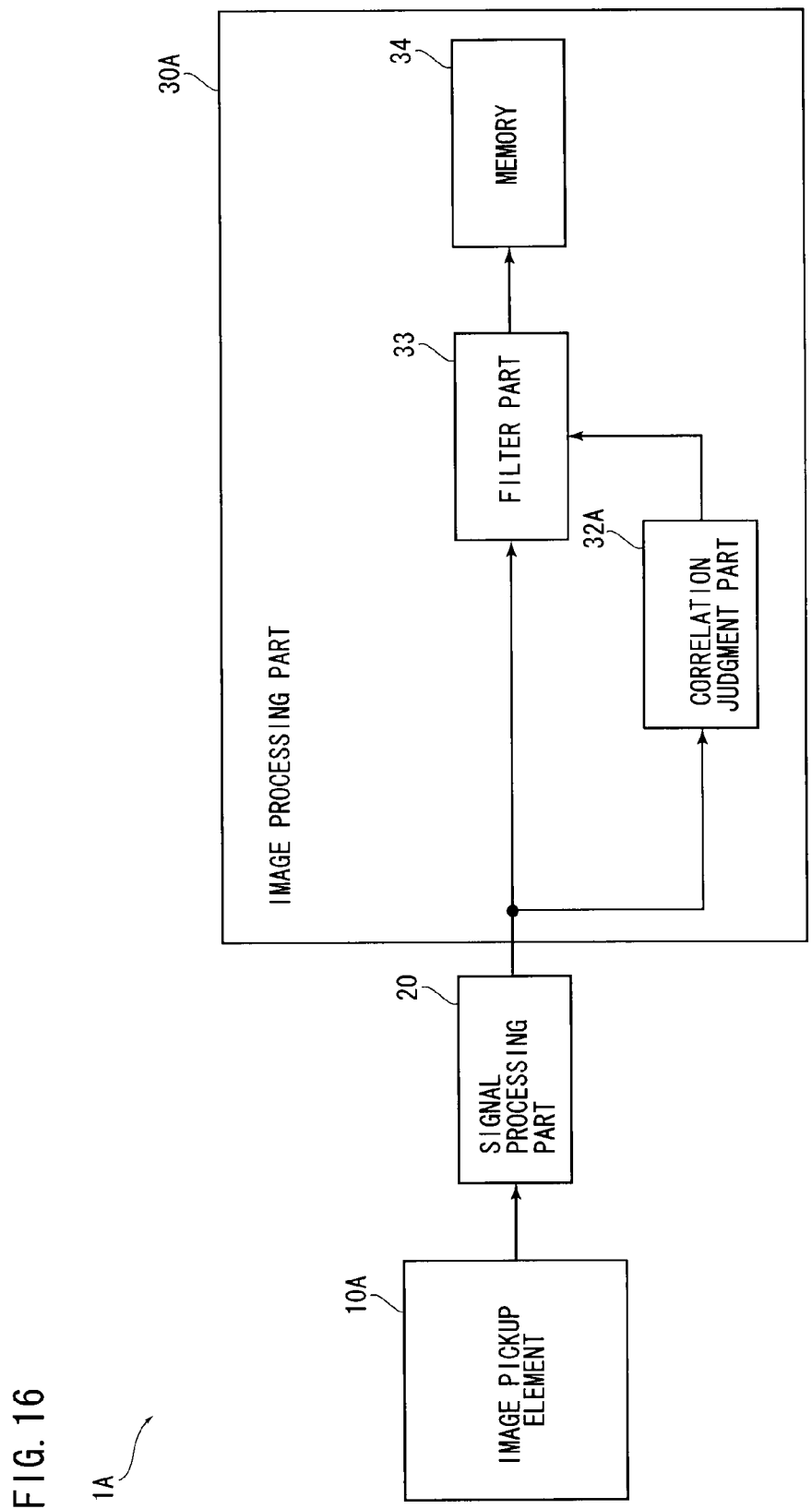
FIG. 16 is a block diagram showing an image processing apparatus in accordance with another preferred embodiment.

An image pickup apparatus 1A shown in FIG. 16 comprises an image pickup element 10A and the image pickup element 10A outputs pixel signals of pixels having all the color components of R, G and B. An image processing part 30A inputs complete pixel signals having all the color components of R, G and B through the signal processing part 20.

A correlation judgment part 32A performs calculation expressed by Eq. 30 to obtain a correlation value in the vertical direction. The pixel signs using reference character "P" in Eqs. 30 to 33 correspond to the pixel array of FIG. 6. In Eqs. 30 to 33, the pixel used for calculating the correlation value may be an any one of the color components of R, G and B.

$$Cvertical = \frac{|P02-P12|+|P12-P22|+|P22-P32|+|P32-P42|}{4} \tag{Eq. 30}$$

Further, the correlation judgment part 32A performs calculation expressed by Eq. 31 to obtain a correlation value in the horizontal direction.

$$Chorizontal = \frac{|P20-P21|+|P21-P22|+|P22-P23|+|P23-P24|}{4} \tag{Eq. 31}$$

Further, the correlation judgment part 32A performs calculation expressed by Eq. 32 to obtain a correlation value in the diagonal A direction.

$$CdiagonalA = \frac{|P00-P11|+|P11-P22|+|P22-P33|+|P33-P44|}{4} \tag{Eq. 32}$$

Further, the correlation judgment part 32A performs calculation expressed by Eq. 33 to obtain a correlation value in the diagonal B direction.

$$CdiagonalB = \frac{|P04-P13|+|P13-P22|+|P22-P31|+|P31-P40|}{4} \tag{Eq. 33}$$

Details of the operation after the calculation of the correlation values in the four directions are the same as those in the first or second preferred embodiment. The correlation direction and the corrected correlation direction are judged and further the direction of edge is judged, and then the filtering operation is performed.

The preferred embodiments of the present invention have been discussed above, but the filtering operation can be applied not only to the pixel signals in the RGB color space but also to pixel signals in various color spaces including the YUV color space. Further, the filter factor may be changed in accordance with the types of the color spaces.

Though the four directions, i.e., the vertical direction, the horizontal direction, the diagonal A direction and the diagonal B direction, are adopted as the directions for obtaining the correlation values in the above preferred embodiments, this is one example. Correlation values may be obtained in six, eight or more directions. Further, the angle of diagonal direction is not particularly limited.

While the invention has been shown and described in detail, the foregoing description is in all aspects illustrative and not restrictive. It is therefore understood that numerous modifications and variations can be devised without departing from the scope of the invention.

What is claimed is:

1. An image processing apparatus, comprising:
    an input part configured to input a pixel signal;
    an edge judgment part configured
        to calculate a first correlation between a specified pixel and a first direction, and a second correlation between said specified pixel and a second direction, using pixel signals in a predetermined area around said specified pixel,
        to judge that said specified pixel is on an edge when the first correlation is a highest one and the second correlation is smaller than a predetermined reference, and
        to judge that the direction of edge is the first direction in a case where said specified pixel is a pixel on the edge; and
    a filtering part configured to perform a filtering operation having characteristics related to the direction of edge in the case where said specified pixel is a pixel on the edge.

2. The image processing apparatus according to claim 1, wherein
    said filtering part performs a filtering operation having a first characteristic on the first direction and performs a filtering operation having a second characteristic on the second direction orthogonal to said first direction.

3. The image processing apparatus according to claim 2, wherein
    said filtering operation having said first characteristic is a noise removal filtering operation using pixels in said first direction and said filtering operation having said second characteristic is an edge enhancement operation using pixels in said second direction.

4. The image processing apparatus according to claim 1, wherein
    said filtering part performs a filtering operation having a first characteristic on the first direction and performs a filtering operation having a second characteristic on the second direction orthogonal to said first direction if it is judged that correlation is smallest in said second direction.

5. The image processing apparatus according to claim 4, wherein
said filtering operation having said first characteristic is a noise removal filtering operation using pixels in said first direction and said filtering operation having said second characteristic is an edge enhancement operation using pixels in said second direction.

6. The image processing apparatus according to claim 1, wherein
said filtering part performs a filtering operation having a first characteristic on the first direction and performs a filtering operation having a second characteristic on the second direction orthogonal to said first direction if it is judged that correlation is smallest in said second direction, and
said filtering part performs a filtering operation having a third characteristic on said first direction and performs a filtering operation having a fourth characteristic on said second direction orthogonal to said first direction if it is not judged that correlation is smallest in said second direction.

7. The image processing apparatus according to claim 6, wherein
said filtering operation having said first or third characteristic is a noise removal filtering operation using pixels in said first direction and said filtering operation having said second or fourth characteristic is an edge enhancement operation using pixels in said second direction.

8. The image processing apparatus according to claim 1, wherein
said filtering part includes
a part for performing a filtering operation having characteristics not related to a specific direction in a case where said specified pixel is not a pixel on the edge.

9. The image processing apparatus according to claim 8, wherein
said filtering part performs a filtering operation having characteristics not related to a specific direction if it is judged on the basis of a predetermined criterion that correlation of said specified pixel is high in a plurality of directions.

10. The image processing apparatus according to claim 8, wherein
said filtering part performs a filtering operation having characteristics not related to a specific direction if it is judged on the basis of a predetermined criterion that correlation of said specified pixel is small in any direction.

11. The image processing apparatus according to claim 8, wherein
said edge judgment part judges whether said specified pixel is a pixel on the edge or not and judges the direction of edge by obtaining said state of correlation on each of four directions including a vertical direction, a horizontal direction, a first diagonal direction having the inclination of 45 degrees counterclockwisely with respect to the vertical direction and a second diagonal direction having the inclination of 45 degrees clockwisely with respect to the vertical direction.

12. The image processing apparatus according to claim 1, wherein
said filtering part rewrites a filter factor in accordance with the required characteristic.

13. The image processing apparatus according to claim 1, wherein
said edge judgment part judges whether said specified pixel is a pixel on the edge or not and judges the direction of edge by obtaining a state of correlation on each of four directions including a vertical direction, a horizontal direction, a first diagonal direction having the inclination of 45 degrees counterclockwisely with respect to the vertical direction and a second diagonal direction having the inclination of 45 degrees clockwisely with respect to the vertical direction.

14. The image processing apparatus according to claim 1, wherein
a pixel signal inputted by said input part is a signal having only some of color components in a predetermined color space, and
said image processing apparatus further comprises
an interpolation part for performing color interpolation on the pixel signals,
wherein said filtering part performs a filtering operation having characteristics related to the direction of edge on the pixel signals after the interpolation.

* * * * *